Dec. 17, 1940.   H. L. NORTON   2,225,017
ANTI-SIDE-SLIPPING COMBINATION FOR MOTOR VEHICLES
Filed Sept. 9, 1939
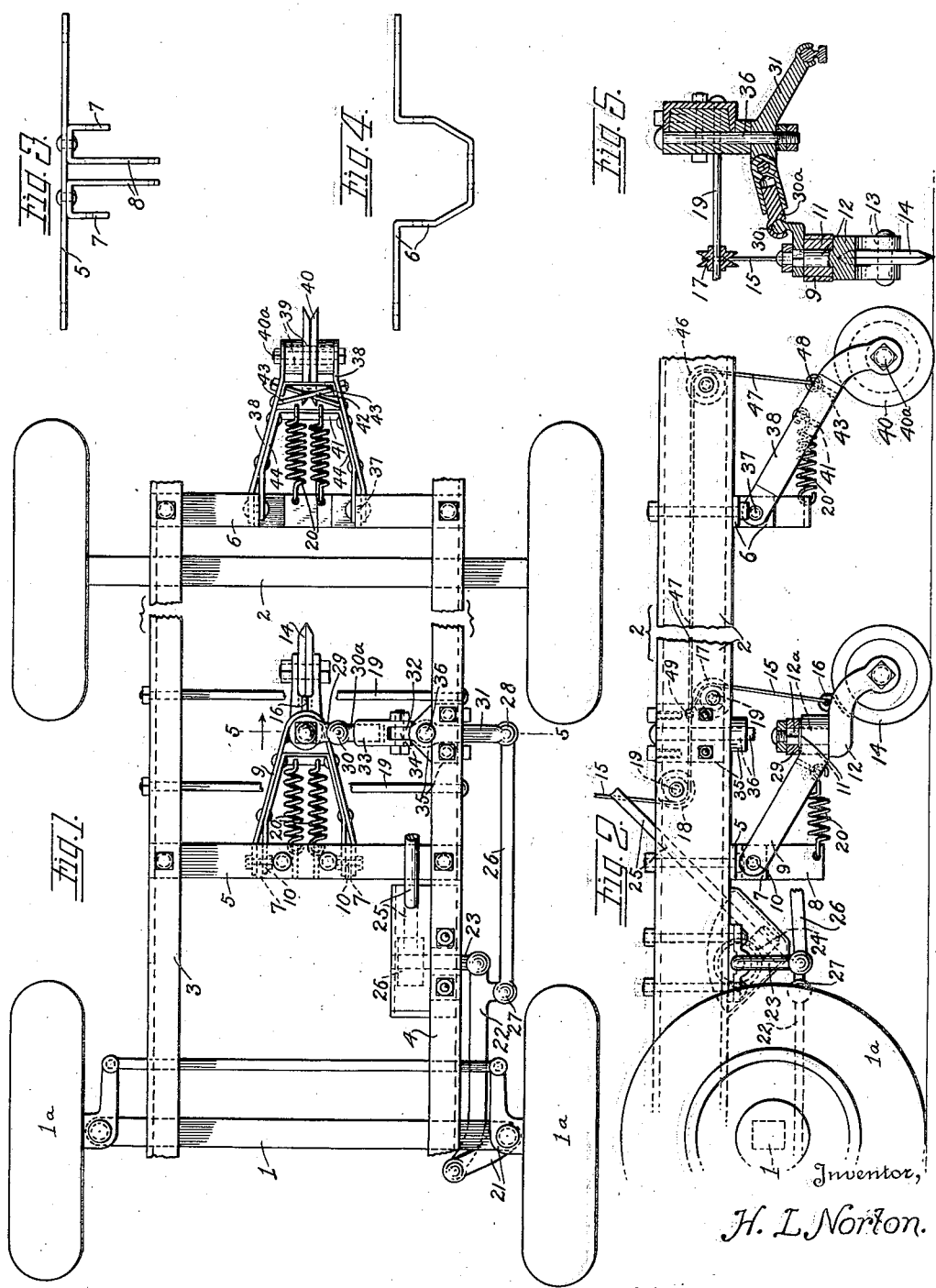
Inventor,
H. L. Norton.
By Sterling P. Buck,
Attorney.

Patented Dec. 17, 1940

2,225,017

UNITED STATES PATENT OFFICE 2,225,017

ANTI-SIDE-SLIPPING COMBINATION FOR MOTOR VEHICLES

Homer L. Norton, Shepherd, Mich.

Application September 9, 1939, Serial No. 294,059

4 Claims. (Cl. 188—5)

This invention relates to what is generally known as anti-skid devices, but I choose the more definite title, anti-side-slipping combination for motor vehicles.

In part, this invention is a continuation, and in part an improvement, on the device described, claimed and allowed in my patent application No. 201,463, now Patent No. 2,179,515 dated Nov. 14, 1939.

One object of this invention is to supplement the anti-slipping device behind the rear wheels of a motor vehicle, by a somewhat similar anti-slipping device behind the front wheels of the motor vehicle, and to operatively connect these devices for operation in unison, so that the possibility of side-slipping of either front or rear of the motor vehicle is minimized.

Another object of the invention is to mount a road-engaging wheel on a journal-member in proper relation to be turned horizontally, and to provide a practical and effective connection between the journal-member and the steering mechanism of the motor vehicle, whereby the road-engaging wheel is steered automatically by the operation of steering the front wheels of the motor vehicle.

Another object of the invention is to provide on the chassis-beams, of the motor vehicle, the supporting means and the steering-connection of the front ground-engaging or road-engaging wheel, and to provide in said steering connection such pivotal, telescoping and universal connections that will permit the ground-engaging wheel to be raised and lowered without affecting its ability to turn the wheel-supporting journal-member in its raised, lowered and intermediate positions; also that will enable the road-engaging wheel to remain on the road or ground unaffected by the upward and downward vibrations of the chassis while the motor vehicle is traveling.

Other objects and important features are pointed out or implied in the following details of description, in connection with the accompanying drawing in which:

Fig. 1 is a top-plan view of my invention applied on a sufficient part of a motor truck or four-wheeled motor vehicle to illustrate the use, construction and operation of the invention; parts of the chassis-beams being broken away, so the front and rear anti-slipping devices appear to be nearer to one another than they would be in actual practice; springs and other irrelevant connections between the chassis-beams and the axles being omitted to avoid confusion in showing the structure that comprises the invention; and certain elements of the invention being broken off and omitted, being shown in other figures of the drawing.

Fig. 2 is a side elevation of the invention in connection with the greater portion of the motor-vehicle parts shown in Fig. 1, also with certain elements not shown in Fig. 1, parts in vertical section and parts broken away.

Fig. 3 is a front or rear view of one of the cross-beams and united attaching ears, such as shown at the middle portions of Figs. 1 and 2, constituting the means to pivotally support the front end of an arm or frame that carries the journal-bearing for the front sharp-edged road-engaging wheel.

Fig. 4 is a front or rear view of a bent cross-beam such as shown at the rear in Figs. 1 and 2 and which serves the same purpose as the cross-beam and ears of Fig. 3 and may be interchanged therewith.

Fig. 5 is a vertical sectional view taken along the line 5—5 of Fig. 1.

Referring to the drawing in detail, in which similar reference numerals refer to similar parts throughout the several views, the invention is described in detail as follows:

The front axle is seen at 1, the rear axle at 2, the right chassis-beam at 3, and the left chassis-beam at 4. Cross-beams 5 and 6, such as shown separately in Figs. 3 and 4, of any other appropriate kind, are united with the chassis-beams by any appropriate means, for instance, bolts and nuts, as shown. To the beam 5 is secured short outer attaching ears or pivot-bearings 7 and long inner attaching ears 8. An arm or fabricated frame 9 has its front end pivotally connected, at 10, to the pivot-bearings 7 which are widely spaced from one-another for cooperation with the flared or wide front end of this arm or frame in preventing lateral movement of its rear end with respect to the chassis-beams. For strength and rigidity, this fabricated arm or frame 9 is preferably composed of flat bars of iron or steel, one bent to V-shape and embracing the other one which is bent to U-shape, these being riveted or otherwise secured together, and the rear end of the V-shaped element being welded or otherwise united with a bearing-element 11, as indicated in Figs. 2 and 5, so the bearing block may properly be considered as a part of the arm 9. Through the vertical bore of this block 11 extends the pivot or journal of the journal-member 12 whose bifurcated lower end carries the journal 13 on which the sharp-edged road-engaging wheel 14 is journaled. The front ends of strong contractile springs are secured to the attaching ears 8, and their rear ends are secured to an attaching element of the arm 9, and each of these springs constantly tends to pull and hold the wheel 14 hard-pressed against the ground or road on which the motor vehicle is traveling; but normally, when the road is not slippery, the rear end of the arm 9 and the wheel 14 are held up by means of a lifting line 15, connected to the journal-member 12 by means of an eye or loop on the latter, as indicated at 16. This line 15 is engaged in peripheral grooves of pulleys 17 and 18 that are journaled on cross-rods 19 that constitute axles therefor, and this line may be pulled by hand or by any appropriate means for lifting the road-engaging wheel 14 against the resistance of the springs 20.

In order that the sharp-edged road-engaging wheel 14 shall prevent side-slipping of the front wheels (on the axle 1) when the motor vehicle is traveling around a curve of the road, it is necessary to cause it to be steered or swung rightward and leftward for respective right and left curves and to the same extent that the front wheels 1a of the vehicle are swung; so I have provided a steering connection therefor and combined the same with the steering mechanism by which the ends or spindles of the front axle 1 are deflected, as follows:

A conventional form of knuckle-joint includes a combined pivot and lever 21; to one arm of this lever is connected a link 22 by means of a universal joint; and the rear end of this lever is connected, by a universal joint, to an arm 23 that is swung forward and backward by the usual form of worm-gearing 24 and steering rod 25. A supplemental link 26 is connected, by a universal joint 27, to a lateral projection of the link 22; the rear end of this link 26 is connected, by a universal joint 28, to a knuckle-jointed lever which has a telescopic arm that is connected to a crank or arm 29, by a universal joint 30; and that this crank or arm 29 is fixed on the upper end of the pivot or journal 12a of the journal-member 12. The knuckle-jointed telescopic lever consists of an outer arm 31, an inner arm or joint-element 32, a tubular element 33, pivoted at 34 to the joint-element 32, and a shank 30a slidable longitudinally in the tubular element 33 and united with an element of the universal joint 30. This jointed telescopic lever is pivotally mounted on one of the chassis-beams through the medium of a bearing-block 35 which is bolted or otherwise united with the chassis-beam 4 and has a bore through which a pivot 36 extends. On this bolt or pivot 36, the jointed telescopic lever is swung horizontally by means of the steering mechanism and causes the journal member 12 and wheel 14 to be steered according to the steering of the front wheels on the front axle 21, or on the spindles thereof.

The rearward anti-side-slipping device has its fabricated frame's front end portions pivotally secured to the vertically disposed parts of the cross-beam 6, as indicated at 37 in Figs. 1 and 2. This frame or pivotally mounted arm is designed for exceeding rigidity and comparative ease of manufacture, the outer beams 38 having their apertured rear ends spaced from one another by a tubular journal 39 on which the peripherally grooved and sharp-edged road-engaging wheel 40 is journaled, and a bolt 40a with its nut serves as a clamp to hold the rear ends of the beams 38 against the ends of the tubular journal so as to increase the rigidity of the frame or arm which is also made very rigid by the cross-elements or braces 41, 42 and 43, the elements 42 being clamp-bolts that hold the beams 38 tight against the parts 41 and 43. The U-shaped member 5 that includes the cross-brace 41 also includes the reenforcing side-elements 44 that are riveted or otherwise secured to the elements 38. It should be noted that the road-engaging wheel 40 is a distance in rear of the rear wheels on the axle 2; but this feature is covered in the claim of the allowed patent application No. 201,463. It is desired however to emphasize the importance of the exceeding strength and rigidity of the present arm or frame that carries the wheel 40 in this rear position; for when the motor vehicle is traveling fast around a curved slippery road, there is a strong tendency for the rear wheels to side-slip toward the outer side of the curve; but such tendency is overcome by a counter-tendency of the wheel 40, in this rear position, to force the rear wheels toward the inside of the curve.

Referring now to Fig. 2, it will be seen that a pulley 46 is carried by a journal on the chassis-beam 2 or on both the chassis-beams as are the journals 19; and a lifting line 47 has its rear-lower end secured to the rear arm at 48, passes thence over the pulley 46, thence to the point at 49 where it is secured to the line 15 so as to be operated by the latter, and so that both the front and rear road-engaging wheels are raised simultaneously when the operator causes a pull to be exerted on the upper-front part of the line 15.

Though I have described this invention quite specifically, it is not my intention to limit my patent protection to these precise details of description; for the invention is susceptible of numerous changes within the scope of the inventive ideas as implied and claimed.

What I claim as my invention is:

1. In combination with chassis-beams and front wheels of a motor vehicle which has a steering mechanism operatively connected to said chassis and to said front wheels for steering the latter when they are traveling along a road, an arm provided with a journal-bearing in one end, means on said chassis-beams to pivotally support the other end of said arm in the proper relation to permit said arm to be swung upward and downward and to prevent said arm from moving laterally with respect to said chassis-beams, a journal-member having an upright journal seated in the journal bearing of said arm, a road-engaging wheel rotatably secured to the lower end of said journal-member in the proper relation to roll along said road when the said arm is in its lowermost position, and mechanical means operatively connected to said steering mechanism and said journal member for steering said road-engaging wheel in the proper relation to minimize side-slipping of the sharp-edged wheel and of said front wheels when the motor vehicle is traveling along curves of said road said mechanical means being inclusive of a vertical pivot provided with means for securing it to one of said chassis beams, a lever fulcrumed on said pivot and having its outer end operatively connected to said steering mechanism in the proper relation to be swingable horizontally by the operation of said steering mechanism, a crank or arm on said journal-member, and means operatively connecting said crank or arm to said lever in the proper relation to permit the road-engaging wheel to be steered while in the road-engaging position and to remain in the road-engaging position while the chassis vibrates upward and downward.

2. In an attachment for a motor vehicle which includes a chassis and a steering mechanism, the combination of a cross-beam provided with means for securing it to the chassis, an arm having one end pivotally secured to said cross-beam and having a journal-bearing in its other end, a journal-member which includes an upright journal seated for rotary movements in said journal-bearing, a road-engaging wheel rotatably engaged with said journal-member and having its axis at right angles to the axis of said journal, and steering means operatively connected to said journal-member and having elements of proper construction and arrangement for operative connection with said steering mechanism so as to effect movement of said road-engaging wheel about the axis of said upright journal, the said steering means being inclusive of a crank on said journal-member, a knuckle-jointed lever provided with means for pivotally connecting it to said crank, and a fulcrum for said lever provided with means for securing it to the motor vehicle in the proper relation to be operable by said steering mechanism.

3. In an attachment for a motor vehicle which includes a chassis and a steering mechanism, the combination of a cross-beam provided with means for securing it to said chassis, an arm pivotally secured to said cross-beam and having a journal-bearing in one end portion, a journal-member which includes an upright journal seated for rotary movement in said journal-bearing, a road-engaging wheel rotatably engaged with said journal-member and having its axis at right angles to the axis of said journal, and steering means operatively connected to said journal-member and having elements of proper construction and arrangement for operative connection with said steering mechanism so as to effect movements of said road-engaging wheel about the axis of said upright journal, the said steering means being inclusive of a crank on said journal-member, a telescoping lever provided with means for pivotally connecting it to said crank, and a fulcrum for said lever provided with means for securing it to the motor vehicle in the proper relation to be operable by said steering mechanism.

4. The combination defined by claim 2, said knuckle-jointed lever being inclusive of a telescopic arm which is operatively connected to said crank.

HOMER L. NORTON.